United States Patent
Langston et al.

(10) Patent No.: US 9,957,342 B2
(45) Date of Patent: May 1, 2018

(54) PROCESS FOR PREPARING LOW SULFUR DISPERSANT POLYMERS

(71) Applicant: EVONIK OIL ADDITIVES GMBH, Darmstadt, DE (US)

(72) Inventors: Justin August Langston, Kutztown, PA (US); Barbara Voltz, Houston, TX (US); Frank-Olaf Maehling, Mannheim (DE); Michael G Duckworth, Plano, TX (US); Brian Hess, Willow Grove, PA (US); Rhishikesh Gokhale, Darmstadt (DE)

(73) Assignee: Evonik Oil Additives GmbH, Darmstadt (DE)

( * ) Notice: Subject to any disclaimer, the term of this patent is extended or adjusted under 35 U.S.C. 154(b) by 0 days. days.

(21) Appl. No.: 14/440,232

(22) PCT Filed: Oct. 8, 2013

(86) PCT No.: PCT/EP2013/070913
§ 371 (c)(1),
(2) Date: May 1, 2015

(87) PCT Pub. No.: WO2014/067749
PCT Pub. Date: May 8, 2014

(65) Prior Publication Data
US 2015/0274875 A1 Oct. 1, 2015

Related U.S. Application Data

(60) Provisional application No. 61/721,689, filed on Nov. 2, 2012, provisional application No. 61/821,930, filed on May 10, 2013.

(30) Foreign Application Priority Data

Nov. 13, 2012 (EP) .................................. 12192331

(51) Int. Cl.
| | |
|---|---|
| *C08F 265/04* | (2006.01) |
| *C10L 1/18* | (2006.01) |
| *C10L 10/14* | (2006.01) |
| *C10L 1/14* | (2006.01) |
| *C10L 1/16* | (2006.01) |
| *C08L 51/00* | (2006.01) |
| *C10L 1/22* | (2006.01) |
| *C08F 265/06* | (2006.01) |
| *C10L 1/196* | (2006.01) |
| *C10L 1/236* | (2006.01) |
| *C10L 10/00* | (2006.01) |

(52) U.S. Cl.
CPC .......... *C08F 265/04* (2013.01); *C08F 265/06* (2013.01); *C08L 51/003* (2013.01); *C10L 1/143* (2013.01); *C10L 1/16* (2013.01); *C10L 1/18* (2013.01); *C10L 1/1963* (2013.01); *C10L 1/1966* (2013.01); *C10L 1/22* (2013.01); *C10L 1/236* (2013.01); *C10L 1/2364* (2013.01); *C10L 1/2366* (2013.01); *C10L 1/2368* (2013.01); *C10L 10/00* (2013.01); *C10L 10/14* (2013.01); *C08L 2203/40* (2013.01); *C10L 1/1616* (2013.01); *C10L 2200/0259* (2013.01); *C10L 2200/0438* (2013.01); *C10L 2200/0446* (2013.01); *C10L 2200/0469* (2013.01); *C10L 2200/0476* (2013.01); *C10L 2230/14* (2013.01)

(58) Field of Classification Search
USPC .............................. 44/340; 524/548; 525/279
See application file for complete search history.

(56) References Cited

U.S. PATENT DOCUMENTS

| | | | |
|---|---|---|---|
| 2,646,424 | A | 7/1953 | Wehr et al. |
| 3,985,942 | A | 10/1976 | Suzuki et al. |
| 4,161,392 | A | 7/1979 | Cusano et al. |
| 4,369,296 | A | 1/1983 | Podszun et al. |

(Continued)

FOREIGN PATENT DOCUMENTS

| | | |
|---|---|---|
| CN | 1786132 A | 6/2006 |
| CN | 1918267 A | 2/2007 |

(Continued)

OTHER PUBLICATIONS

English translation of Combined Chinese Office Action and Search Report dated Oct. 10, 2016 in Patent Application No. 201380056975.X.

(Continued)

Primary Examiner — Prem C Singh
Assistant Examiner — Chantel Graham
(74) Attorney, Agent, or Firm — Oblon, McClelland, Maier & Neustadt, L.L.P.

(57) ABSTRACT

The present invention relates to a process for preparing grafted polyalkyl(meth)acrylates (PAMAs) containing dispersant repeating units in the polymer backbone as well as in the grafted layer, which polymers are characterized by a low sulfur content, the products available by this process and their use as an additive to fuels, especially to middle distillates and blends thereof. The present invention further relates to a composition comprising the grafted polyalkyl (meth)acrylates prepared by the process according to the present invention and the use of said composition as an additive component to fuels, especially to middle distillates and blends thereof, and for improving the cold flow properties of fuel oil and fuel oil compositions, especially to middle distillate fuels and blends thereof.

19 Claims, No Drawings

(56) References Cited

U.S. PATENT DOCUMENTS

| | | | |
|---|---|---|---|
| 4,867,894 A * | 9/1989 | Pennewiss | C10L 1/1963 |
| | | | 508/469 |
| 5,035,719 A | 7/1991 | Sung et al. | |
| 6,391,071 B1 | 5/2002 | Krull et al. | |
| 7,560,420 B2 | 7/2009 | Kinker et al. | |
| 2007/0161755 A1 | 7/2007 | Siggelkow et al. | |

FOREIGN PATENT DOCUMENTS

| | | |
|---|---|---|
| CN | 101061207 A | 10/2007 |
| CN | 101389739 A | 3/2009 |
| DE | 966 375 C | 8/1957 |
| DE | 25 02 283 A1 | 7/1975 |
| DE | 30 10 373 A1 | 10/1981 |
| DE | 199 27 561 C1 | 12/2000 |
| EA | 201171161 A1 | 3/2012 |
| EP | 0 236 844 A2 | 9/1987 |
| EP | 1 533 359 A1 | 5/2005 |
| JP | 53-121890 A | 10/1978 |
| JP | 53-121891 A | 10/1978 |
| JP | 04-505033 | 9/1992 |
| JP | 07-286189 | 10/1995 |
| JP | 2007-532702 | 11/2007 |
| JP | 2008-506794 | 3/2008 |
| JP | 2011-074983 | 4/2011 |
| RU | 2113444 C1 | 6/1998 |
| RU | 2156277 | 9/2000 |
| RU | 2441902 C2 | 5/2010 |
| RU | 2010107871 A | 9/2011 |
| WO | WO 2006/066649 A2 | 6/2006 |
| WO | 2011/095249 A1 | 8/2011 |

OTHER PUBLICATIONS

International Search Report and Written Opinion of the International Searching Authority dated Dec. 18, 2013 in PCT/EP13/070913 Filed Oct. 8, 2013.

European Search Report dated Mar. 15, 2013 in European Application No. 12192331.2 Filed Nov. 13, 2012.

Combined Written Opinion and Search Report dated Dec. 22. 2015 in Singaporean Patent Application No. 11201503464S.

* cited by examiner

PROCESS FOR PREPARING LOW SULFUR DISPERSANT POLYMERS

The present invention relates to a process for preparing grafted polyalkyl (meth)acrylates (PAMAs) containing dispersant repeating units in the polymer backbone as well as in the grafted layer, which polymers are characterized by a low sulfur content, the products available by this process and their use as an additive to fuels, especially to middle distillates and blends thereof. The present invention further relates to a composition comprising the grafted polyalkyl (meth)acrylates prepared by the process according to the present invention and the use of said composition as an additive component to fuels, especially to middle distillates and blends thereof, and for improving the cold flow properties of fuel oil and fuel oil compositions, especially to middle distillate fuels and blends thereof.

It is well known to those skilled in the art that middle distillate fuels typified by diesel oil (e.g. heating oil), jet fuel, fuel oils, kerosene etc. may be stored for extended periods of time under unfavourable conditions which are conducive to formation of solid deposits.

These deposits, which are produced during storage at room temperature in the presence of air, accumulate on strainers, filters, screens etc. with which the oil comes into contact and ultimately plug the openings with resultant problems in operation.

The formation of insoluble sediments results e.g. in decreased filter flow rates or increased nozzle plugging.

To avoid the formation of ageing products and sediments certain additives are added to the diesel fuels and heating oils in the mineral oil refineries, at fuel terminals or fuel blenders. Typically used additive packages comprise antioxidants, detergent additives and optionally cetane number improvers as the main constituents as well as cold flow improvers and anti-icing additives.

It was surprisingly found that a grafted polyalkyl (meth)acrylate copolymer containing N-dispersant monomers both in the polymer backbone as well as in the grafted side-chain can be used to stabilize additive packages for middle distillates.

The polymer can disperse particles, aged components like sludge and gum and/or n-paraffin wax crystals.

Current fuel specifications limit the sulfur content to a few ppm. That means that additives which are added to stabilize fuels or otherwise improve the performance of fuels should preferably not contain any sulfur.

It is commonly known that polymers containing basic nitrogen substituents can be used as oil-soluble surface-active agents (C. B. Biswell et al, "New Polymeric Dispersants for Hydrocarbon Systems", Industrial and Engineering Chemistry 1955, 47, 8, 1598-1601). Such N-dispersant polymers can be prepared by copolymerizing N-containing monomers. Current dispersant products contain approximately 750 ppm of sulfur.

U.S. Pat. No. 5,035,719 describes the use of dispersant polyalkyl (meth)acrylates for the improvement of middle distillate storage stability. The patent makes no claim to the sulfur content of the prepared polymers, nor does it suggest a process to prepare said polymers.

It was therefore an object of the present invention to find a process for preparing an almost sulfur-free N-dispersant polyalkyl (meth)acrylate.

The inventive process should include as key steps:
- the use of polymerization and dilution oils with a low sulfur content;
- removal of thiol chain transfer agents from the recipe; and
- modifying the process conditions in order to control the molecular weight after the removal of the thiol chain transfer agent.

SUMMARY OF THE INVENTION

In accordance with a first aspect of the invention, there is provided a process for preparing grafted polyalkyl (meth)acrylate copolymers (A), containing as a polymer backbone monomer units comprising:

(A1) 0% to 40% by weight of one or more ethylenically unsaturated ester compounds of formula (I)

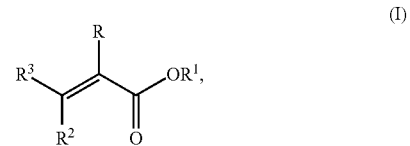

wherein
R is H or $CH_3$,
$R^1$ represents a linear or branched, saturated or unsaturated alkyl group with 1 to 5 carbon atoms or a cycloalkyl group with 3 to 5 carbon atoms,
$R^2$ and $R^3$ independently represent H or a group of the formula —COOR', wherein R' is H or a linear or branched, saturated or unsaturated alkyl group with 1 to 5 carbon atoms or a cycloalkyl group with 3 to 5 carbon atoms, (A2) 20% to 93.5% by weight of one or more ethylenically unsaturated ester compounds of formula (II)

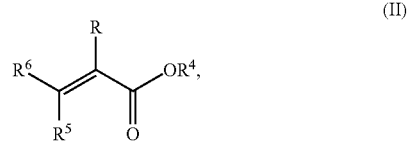

wherein
R is H or $CH_3$,
$R^4$ represents a linear or branched, saturated or unsaturated alkyl group with 6 to 15 carbon atoms,
$R^5$ and $R^6$ independently represent H or a group of the formula —COOR'', wherein R'' is H or a linear or branched, saturated or unsaturated alkyl group with 6 to 15 carbon atoms, (A3) 5% to 60% by weight of one or more ethylenically unsaturated ester compounds of formula (III)

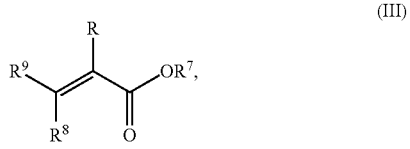

wherein
R is H or $CH_3$,
$R^7$ represents a linear or branched, saturated or unsaturated alkyl group with 16 to 30 carbon atoms,
$R^8$ and $R^9$ independently represent H or a group of the formula —COOR''' wherein R''' is H or a linear or branched, saturated or unsaturated alkyl group with 16 to 30 carbon atoms, and (A4) 1% to 40% by weight of at least one N-dispersant monomer selected from the group consisting of vinyl pyridine, N-vinyl imidazole, N-vinyl pyrrolidone (NVP), morpholinoethyl methacrylate, N-vinyl caprolactam, N,N-dimethylaminoethyl methacrylate (DMAEMA), tert-butyl aminoethyl methacrylate, N,N-dimethylaminopropylmethacrylamide (DMAPMAm) and dimethylaminopropylacrylamide, dimethylaminoethylacrylamide,
wherein components (A1) to (A4) add up to 100% by weight; and
(A5) 0.5% to 10% by weight of at least one N-dispersant monomer selected from the group consisting of vinyl pyridine, N-vinyl imidazole, N-vinyl pyrrolidone (NVP), morpholinoethyl methacrylate, N-vinyl caprolactam, N,N-dimethylaminoethyl methacrylate (DMAEMA), tert-butyl aminoethyl methacrylate, N,N-dimethylaminopropylmethacrylamide (DMAPMAm), dimethylaminopropylacrylamide and dimethylaminoethylacrylamide which is grafted onto the polymer backbone,
wherein components (A1) to (A5) add up to 100% by weight,
the process comprising the steps of:
(a) charging a mineral oil to a reaction vessel;
(b) preparing a monomer mixture of monomer units (A1) to (A4) as hereinbefore described and a first reaction initiator;
(c) adding the mixture as prepared under step (b) to the mineral oil of step (a), preferably over the course of 1 to 5 hours, more preferably over the course of 2 to 3 hours;
(d) polymerizing the mixture as obtained under step (c), preferably in the absence of any chain transfer agent;
(e) optionally isolating the polymer as obtained under step (c);
(f) adding monomer units (A5) as hereinbefore described;
(g) adding a second reaction initiator;
(h) polymerizing the mixture as obtained under step (g);
(i) optionally isolating the polymer as obtained under step (h); and/or
(j) diluting the polymer mixture as obtained under step (h) or the isolated polymer obtained under step (i) with a mineral oil to achieve the desired concentration of polymer in oil.

DETAILED DESCRIPTION OF THE INVENTION

Within the context of the present invention, the term "alkyl (meth)acrylate" refers to both the alkyl acrylate and the alkyl methacrylate species or a mixture thereof. Alkyl methacrylates are preferred.

Non-limiting examples of component (A1) include acrylates, methacrylates, fumarates and maleates which derive from saturated alcohols such as methyl (meth)acrylate, ethyl (meth)acrylate, n-propyl (meth)acrylate, isopropyl (meth)acrylate, n-butyl (meth)acrylate, tert-butyl (meth)acrylate and pentyl (meth)acrylate; cycloalkyl (meth)acrylates, like cyclopentyl (meth)acrylate, cyclohexyl (meth)acrylate and 3-vinylcyclohexyl (meth)acrylate; (meth)acrylates that derive from unsaturated alcohols like 2-propynyl (meth)acrylate, allyl (meth)acrylate and vinyl (meth)acrylate; and the corresponding fumarates and maleates.

Monomer (A1) is present in an amount of 0% to 40% by weight, preferably 1% to 20% by weight, based on the total weight of components (A1), (A2), (A3) and (A4).

In a further embodiment of the present invention component (A1) comprises monomer units of one or more ethylenically unsaturated ester compounds of formula (I)

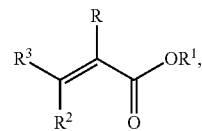

wherein
R is H or $CH_3$, preferably $CH_3$,
$R^1$ represents a linear or branched, saturated or unsaturated alkyl group with 1 to 5 carbon atoms or a cycloalkyl group with 3 to 5 carbon atoms and
$R^2$ and $R^3$ independently represent H.

Non-limiting examples of component (A2) include (meth)acrylates, fumarates and maleates that derive from saturated alcohols, such as hexyl (meth)acrylate, 2-ethylhexyl (meth)acrylate, heptyl (meth)acrylate, octyl (meth)acrylate and nonyl (meth)acrylate 2-tert-butylheptyl (meth)acrylate, 3-isopropylheptyl (meth)acrylate, 2-n-propylheptyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate and pentadecyl (meth)acrylate; cycloalkyl (meth)acrylates such as bornyl (meth)acrylate, 2,4,5-tri-tert-butyl-3-vinylcyclohexyl (meth)acrylate, 2,3,4,5-tetra-tert-butylcyclohexyl (meth)acrylate; oxiranyl methacrylates such as 10,11-epoxyhexadecyl methacrylate; and the corresponding fumarates and maleates.

Monomer (A2) is present in an amount of 20% to 93.5% by weight, preferably 30% to 60% by weight, based on the total weight of components (A1), (A2), (A3) and (A4).

In a further embodiment monomer (A2) is a $C_{8-15}$-alkyl (meth)acrylate, preferably commercial lauryl(meth)acrylate, or a $C_{10-15}$-alkyl (meth)acrylate fraction. More preferably the backbone monomer is a $C_{8-15}$-alkyl methacrylate, preferably commercial lauryl methacrylate or a $C_{10-15}$-alkyl methacrylate fraction.

In a further embodiment of the present invention component (A2) comprises monomer units of one or more ethylenically unsaturated ester compounds of formula (II)

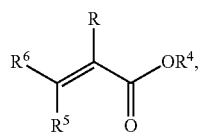

wherein
R is H or $CH_3$, preferably $CH_3$,
$R^4$ represents a linear or branched, saturated or unsaturated alkyl group with 6 to 15 carbon atoms and
$R^5$ and $R^6$ independently represent H.

Non-limiting examples of component (A3) include (meth)acrylates that derive from saturated alcohols, such as hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, docosyl (meth)acrylate, cetyleicosyl (meth)acrylate, stearyleicosyl (meth)acrylate and eicosyltetratriacontyl (meth)acrylate; as well as the corresponding fumarates and maleates; and (meth)acrylates that derive from unsaturated alcohols, such as oleyl (meth)acrylate.

Monomer (A3) is present in an amount of 5% to 60% by weight, preferably 20% to 50% by weight, based on the total weight of components (A1), (A2), (A3) and (A4).

In a further embodiment of the present invention component (A3) comprises monomer units of one or more ethylenically unsaturated ester compounds of formula (III)

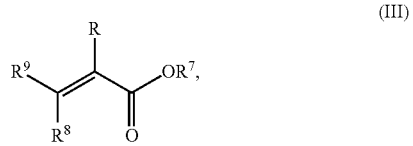

(III)

wherein
R is H or $CH_3$, preferably $CH_3$,
$R^7$ represents a linear or branched, saturated or unsaturated alkyl group with 16 to 30 carbon atoms,
$R^8$ and $R^9$ independently represent H.

The N-dispersant monomer (A4) may specifically be at least one monomer selected from the group consisting of vinyl pyridine, N-vinyl imidazole, N-vinyl pyrrolidone (NVP), morpholinoethyl methacrylate, N-vinyl caprolactam, N,N-dimethylaminoethyl methacrylate (DMAEMA), tert-butyl aminoethyl methacrylate, N,N-dimethylaminopropylmethacrylamide (DMAPMAm), dimethylaminopropylacrylamide, dimethylaminoethylacrylamide and tert-butyl acrylamide or a mixture thereof.

In a further embodiment the N-dispersant monomer (A4) is selected from the group consisting of N-vinyl pyrrolidone (NVP), N,N-dimethylaminoethyl methacrylate (DMAEMA) and N,N-dimethylaminopropylmethacrylamide (DMAPMAm); especially preferred is N-vinyl pyrrolidone.

The amount of N-dispersant monomer (A4) is typically from 1% to 40% by weight, preferably from 2% to 30% by weight, based on the total weight of components (A1), (A2), (A3) and (A4).

The N-dispersant monomer (A5), which is grafted onto the polymer backbone, may specifically be at least one monomer selected from the group consisting of vinyl pyridine, N-vinyl imidazole, N-vinyl pyrrolidone (NVP), morpholinoethyl methacrylate, N-vinyl caprolactam, N,N-dimethylaminoethyl methacrylate (DMAEMA), tert-butyl aminoethyl methacrylate, N,N-dimethylaminopropylmethacrylamide (DMAPMAm), dimethylaminopropylacrylamide and dimethylaminoethylacrylamide.

In a further embodiment the N-dispersant monomer (A5) is selected from the group consisting of N-vinyl pyrrolidone (NVP), N,N-dimethylaminoethyl methacrylate (DMAEMA) and N,N-dimethylaminopropylmethacrylamide (DMAPMAm); especially preferred is N-vinyl pyrrolidone.

In accordance with the invention, the preferred alkyl groups include the methyl, ethyl, propyl, isopropyl, 1-butyl, 2-butyl, 2-methylpropyl, tert-butyl, pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, pentadecyl and the eicosyl group.

The preferred cycloalkyl groups include the cyclopropyl, cyclobutyl, cyclopentyl, cyclohexyl, cycloheptyl and the cyclooctyl group, which optionally are substituted by branched or non-branched alkyl groups.

The preferred alkenyl groups include the vinyl, allyl, 2-methyl-2-propene, 2-butenyl, 2-pentenyl, 2-decenyl and the 2-eicosenyl group.

The polyalkyl (meth)acrylates according to the present invention typically have a number average molecular weight $M_n$ of from 3000 to 150000, preferably 10000 to 100000, as measured by size exclusion chromatography, calibrated versus a polystyrene standard.

The polydispersity $M_w/M_n$ of the polyalkyl(meth)acrylate polymers preferably is in the range of from 1 to 8, especially from 1.5 to 5.0. The weight average molecular weight $M_w$, the number average molecular weight $M_n$ and the polydispersity $M_w/M_n$ can be determined by GPC using a polystyrene as standard.

The molecular weight and the polydispersity can be determined by known methods. For example, gel permeation chromatography (GPC) can be used. It is equally possible to use an osmometric process, for example vapor phase osmometry, to determine the molecular weights. The processes mentioned are, for example, described in: P. J. Flory, "Principles of Polymer Chemistry" Cornell University Press (1953), Chapter VII, 266-316 and "Macromolecules, an Introduction to Polymer Science", F. A. Bovey and F. H. Winslow, Editors, Academic Press (1979), 296-312 and W. W. Yau, J. J. Kirkland and D. D. Bly, "Modern Size Exclusion Liquid Chromatography, John Wiley and Sons, New York, 1979. To determine the molecular weights of the polymers presented herein, preference is given to using gel permeation chromatography. Measurement should preferably be made against polymethacrylate or polystyrene standards.

The architecture of the polymer backbone of the polyalkyl (meth)acrylate polymers is not critical for many applications and properties. Accordingly, these polymers may be random copolymers, gradient copolymers, block copolymers, star polymers, hyperbranched polymers and/or graft copolymers. Block copolymers and gradient copolymers can be obtained, for example, by altering the monomer composition discontinuously during the chain growth. According to the present invention, random copolymers are prepared as polymer backbone.

The polymer backbone can be prepared in one or more steps, and it is possible to use different monomer compositions (A1) to (A4) which may differ. This allows mixtures of polymer backbones to be generated, which can be used advantageously in accordance with the invention.

To prepare graft polymers from the composition obtained in step 1, which generally comprises at least one main chain polymer, at least one monomer composition (A5) is grafted onto a polymer backbone prepared by polymerizing a mixture of components (A1) to (A4).

It is assumed that the grafting forms side chains on the polymer backbone, so that at least a portion of the graft is bonded covalently to the polymer backbone.

The grafting can be effected in one or more steps. In this context, it is possible, inter alia, to change the composition of the monomer composition (A5). For example, different monomers having nitrogen-containing groups can be used.

The performance of graft copolymerizations is common knowledge and is detailed, for example, in Ullmann's Encyclopedia of Industrial Chemistry, Sixth Edition and Rompp Chemie-Lexikon on CD version 2.0, where reference is made to further literature.

Customary free-radical polymerization, which is especially suitable for preparing graft copolymers, is detailed in K. Matyjaszewski, T. P. Davis, Handbook of Radical Polymerization, Wiley Interscience, Hoboken 2002. In general, a polymerization initiator and a chain transfer agent are used for that purpose.

The polymerization is carried in a mineral oil as solvent. The mineral oil charged to a reaction vessel as mentioned in step (a) of the process as mentioned above can be selected from the group consisting of API (American Petroleum Institute) Group II oils, API Group III oils and API Group IV oils and are characterized by a sulfur content of less than 50 ppm, preferably less than 10 ppm.

TABLE 1

API Base Stock Categories (API Publication 1509)

| Group | Sulfur, Wt % | | Saturates | V.I. |
|---|---|---|---|---|
| I | >0.03 | and/or | <90 | 80-119 |
| II | ≤0.03 | and | ≥90 | 80-119 |
| III | ≤0.03 | and | ≥90 | ≥120 |
| IV | All Polyalphaolefins (PAOs) | | | |
| V | All Stocks Not Included in Groups I-IV (Pale Oils and Non-PAO Synthetics) | | | |

In a preferred embodiment the mineral oil is selected from the group consisting of Purity 1017 (Petro Canada; sulfur content less than 10 ppm), Nebase 3043 (Neste Oil), Yubase 3 (sulfur content less than 10 ppm) and Yubase 4 (sulfur content less than 10 ppm).

The sulfur content can generally be determined according to ASTM D2622 (Standard Test Method for Sulfur in Petroleum Products by Wavelength Dispersive X-ray Fluorescence Spectrometry).

In step (b) the monomer units (A1) to (A4)—if present— are mixed with a first reaction initiator.

The usable reaction initiators include the azo initiators widely known in the technical field, such as AIBN and 1,1-azobiscyclohexanecarbonitrile, and also peroxy compounds such as methyl ethyl ketone peroxide, acetylacetone peroxide, dilauryl peroxide, tert-butyl-per-2-ethylhexanoate, ketone peroxide, tert-butyl peroctoate, methyl isobutyl ketone peroxide, cyclohexanone peroxide, dibenzoyl peroxide, tert-butyl-peroxybenzoate, tert-butyl-peroxyisopropyl-carbonate, 2,5-bis(2-ethylhexanoylperoxy)-2,5 dimethyl-hexane, tert-butyl-peroxy-2-ethylhexanoate, tert-butyl peracetate, tert-butyl-peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the aforementioned compounds with one another, and mixtures of the aforementioned compounds with compounds which have not been mentioned but can likewise form free radicals.

Other valid types of initiators are selected from the group consisting of 2,2-di(tert-amylperoxy)propane, tert-butyl per-oxyacetate, dicumyl peroxide, tert-butyl peroxyisobutyrate, tert-amylperoxy 2-ethylhexanoate, dibenzoyl peroxide and 1,1-di(tert-amylperoxy)cyclohexane.

According to the present invention the first reaction initiator used in step (b) of the above mentioned process and the second reaction initiator used in step (g) of the above mentioned process can be the same or different.

Preferably, they are selected from the group consisting of tert-butyl-peroxy-2-ethylhexanoate and tert-butyl peracetate.

The first reaction initiator used in step (b) is added in an amount of from 0.5% to 1.5% by weight, preferably form 0.8% to 1.2% by weight, based on the total amount of components (A1) to (A4).

The second reaction initiator used in step (g) is added in an amount of from 5% to 15% by weight, preferably from 8% to 12% by weight, based on the total amount of component (A5).

The addition of the mixture as mentioned in step (c) is preferably done over the course of 1 to 5 hours, more preferably over the course of 2 to 3 hours.

The polymerization of the mixture as obtained under step (c) and mentioned under step (d) can be carried out in the presence or absence of a chain transfer agent.

Suitable chain transfer agents are in particular sulfur-free compounds which are known per se. These include, for example, without any intention that this should impose a restriction, dimeric alpha-methylstyrene(2,4-diphenyl-4 methyl-1-pentene), enol ethers of aliphatic and/or cycloaliphatic aldehydes, terpenes, alpha-terpinene, terpinols, 1,4-cyclohexadiene, 1,4 dihydronaphthalene, 1,4,5,8-tetrahydronaphthalene, 2,5-dihydrofuran, 2,5-dimethylfuran and/or 3,6-dihydro-2H-pyran; preference is given to dimeric alpha-methylstyrene.

These chain transfer agents are commercially available. They can also be prepared in the manner known to those skilled in the art. For instance, the preparation of dimeric alpha-methylstyrene is described in the patent DE 966 375. Enol ethers of aliphatic and/or cycloaliphatic aldehydes are disclosed in the patent DE 3 030 373. The preparation of terpenes is explained in EP 80 405. The published specifications JP 78/121 891 and JP 78/121 890 explain the preparation of alpha-terpinene, terpinols, 1,4-cyclohexadiene, 1,4-dihydronaphthalene, 1,4,5,8-tetrahydronaphthalene. The preparation of 2,5-dihydrofuran, 2,5-dimethylfuran and 3,6-dihydro-2H-pyran is explained in the published specification DE 2 502 283.

In a preferred aspect of the present invention the polymerization of step (d) is run in the absence of any chain transfer agent.

The polymerization of the polymer backbone can be performed at standard pressure, reduced pressure or elevated pressure. The polymerization temperature should not exceed 200° C. In general, however, it is in the range of −20° C. to 200° C., preferably 50° C. to 150° C. and more preferably 80° C. to 130° C.

The polymer obtained under step (d) can be isolated or directly grafted without any additional isolation and/or purification step.

Also the polymer obtained under step (h) can be isolated or directly grafted without any additional isolation and/or purification step.

In a preferred embodiment of the present invention the two step process is carried out as one-pot reaction.

A second aspect of the present invention is directed to the grafted polyalkyl(meth)acrylate copolymer prepared by the process as mentioned above, characterized by a sulfur content of at most 100 ppm (0 to 100 ppm), preferably at most 50 ppm (0 to 50 ppm), and more preferably at most 40 ppm (0 to 40 ppm).

A third aspect of the present invention is directed to the use of the grafted polyalkyl(meth)acrylate copolymers as defined above as a compatibilizer for additive packages, especially for additive packages for middle-distillates.

A fourth aspect of the present invention is directed to the use of the grafted polyalkyl(meth)acrylate copolymers as defined above as a component in additive packages to stabilize middle-distillates.

A fifth aspect of the present invention is directed to the use of the grafted polyalkyl(meth)acrylate copolymers as defined above for improving the cold flow properties of middle distillates.

A further object of the present invention is directed to a method for improving the cold flow properties of fuel oil compositions, comprising the steps of:
adding at least one grafted polyalkyl (meth)acrylate copolymer as described above to fuels, especially to middle distillate fuels and blends thereof, and
mixing the resulting composition.

The addition is preferably done at temperatures well above the cloud point of the used fuels, preferably at least 10° C. above the cloud point.

A sixth aspect of the present invention is directed to the use of the grafted polyalkyl(meth)acrylate copolymers as defined above for reducing n-Paraffin wax sedimentation in middle distillates, preferably in diesel fuels and blends thereof.

Having generally described the present invention, a further understanding can be obtained by reference to certain specific examples which are provided herein for purposes of illustration only and are not intended to be limiting unless otherwise specified.

Experimental Part

The following substances were used in the synthesis process of polymers:

| Example Name | Description |
| --- | --- |
| Mineral Oil #1 | Mineral oil obtained from Sunoco with a viscosity of 3.6 cSt at 100° C. and a sulfur content of 600 ppm |
| Mineral Oil #2 | Mineral oil obtained from Flint Hill Resources with a viscosity of 3.2 cSt at 100° C. and a sulfur content of 1 ppm |
| Ester #1 | methacrylic acid ester prepared with ALFOL ® 1214 from Sasol North America Inc. |
| Ester #2 | methacrylic acid ester prepared with ALFOL ® 1620 from Sasol North America Inc. |
| Ester #3 | iso-butyl methacrylate |
| LUPEROX ® 26 | tert-butyl peroxy-2-ethylhexanoate |
| LUPEROX ® 7M50 | tert-butyl peracetate |

ALFOL® 1214—Homolog Distribution

| C number | % by weight |
| --- | --- |
| $C_8$ and lower | 0.5 |
| $C_{10}$ | 1.5 |
| $C_{12}$ | 51-57 |
| $C_{14}$ | 41-47 |
| $C_{16}$ and higher | <2 |

ALFOL® 1620—Homolog Distribution

| C number | % by weight |
| --- | --- |
| $n-C_{16}$ | 46.6-52.6 |
| $n-C_{18}$ | 29.4-35.4 |
| $n-C_{20}$ | 12.5-16.5 |
| $n-C_{22}$ | <1.7 |
| $n-C_{24}$ | <3 |

The molecular weights of the described polymers were determined by one of the following methods:
(a) GPC system consisting of a Waters Alliance 2695 system equipped with a Model 2414 RI detector. Two Waters Styragel 5E columns are used with THF at a flow rate of 1.0 mL/min and a temperature of 40° C. Calibration is performed with a broad poly(alkyl methacrylate).
(b) GPC system consisting of Agilent 1100 Series pump equipped with PSS SECcurity inline degaser, Agilent 1100 series RI (detection temperature 40° C.) and UV detectors (wavelength 239 nm). Five SDV columns and one solvent separation column are used with THF as the eluent at a flow rate of 1.0 mL/min. Calibration is performed with PMMA standards obtained from PSS (Mainz).

Polymer 1: Dispersant Polyalkyl (Meth)Acrylate Copolymer with High Sulfur Content Comparative Example 57.5 g of Mineral Oil #1 was charged to a four-neck glass round bottom flask equipped with glass stirrer, condenser and thermocouple. A mixture of 251.5 g of Ester #1, 190.5 g of Ester #2, 77.7 g of Ester #3, 32.8 g of N-vinylpyrrolidone (NVP), 0.86 g of dodecyl mercaptane (DDM) and 2.01 g of LUPEROX 26 was prepared. 336 g of the mixture was added to the round bottom flask containing Mineral Oil #1. The reaction was heated to 115° C. The remainder of the mixture was added to the round bottom flask via an addition funnel over the course of 90 minutes. The temperature of the reaction mixture was maintained at 115° C. throughout the course of the addition. Following the complete addition of the mixture, the reaction was held at 115° C. for an additional 30 minutes. The temperature of the reaction was then raised to 125° C. and 23.0 g of N-vinylpyrrolidone was added followed by 2.3 g of LUPEROX 7M50. The reaction mixture was held at 125° C. for an additional 120 minutes. Finally, Mineral Oil #1 was added to achieve the desired concentration of polymer in oil.

$M_w$: 220000 g/mol
$M_n$: 81000 g/mol
PDI: 2.72
nitrogen content: 1.2%
sulfur content: 750 ppm (determined by XRF according to ASTM D2622)

Polymer 2: Grafted Polyalkyl (Meth)Acrylate Copolymer with N-Dispersant Monomers in Backbone and Graft Layer 374.1 g of Mineral Oil #2 was charged to a four-neck glass round bottom flask equipped with glass stirrer, condenser and thermocouple. The oil was heated to 115° C. A mixture of 251.5 g of Ester #1, 190.5 g of Ester #2, 77.7 g of Ester #3, 32.8 g of N-vinylpyrrolidone, and 5.76 g of LUPEROX 26 was prepared. The entire mixture was added to the round bottom flask via an addition funnel over the course of 120 minutes. The temperature of the reaction mixture was maintained at 115° C. throughout the course of the addition. Following the complete addition of the mixture, the reaction was held at 115° C. for an additional 30 minutes. The temperature of the reaction was then raised to 125° C. and 23.0 g of N-vinylpyrrolidone was added followed by 2.3 g of LUPEROX 7M50. The reaction mixture was held at 125° C. for an additional 120 minutes. Finally, Mineral Oil #2 was added to achieve the desired concentration of polymer in oil.

$M_w$: 119000 g/mol
$M_n$: 47500 g/mol
PDI: 2.51 nitrogen content: 1.2%
sulfur content: 40 ppm (determined by XRF according to ASTM D2622)

The invention claimed is:
1. A process for preparing a grafted polyalkyl (meth) acrylate copolymer (A),
the process comprising:
(a) charging a first mineral oil having a sulfur content of less than 50 ppm to a reaction vessel;
(b) preparing a monomer mixture of monomer units (A2) to (A4), an optional monomer unit (A1), and a first reaction initiator:
(A1) one or more ethylenically unsaturated ester compounds of formula (I)

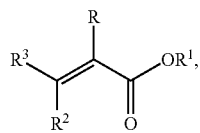

where
R is H or $CH_3$,
$R^1$ represents a linear or branched, saturated or unsaturated alkyl group with 1 to 5 carbon atoms or a cycloalkyl group with 3 to 5 carbon atoms,
$R^2$ and $R^3$ independently represent H or a —COOR' group, where R' is H or a linear or branched, saturated or unsaturated alkyl group with 1 to 5 carbon atoms or a cycloakyl group with 3 to 5 carbon atoms,
(A2) one or more ethylenically unsaturated ester compounds of formula (II)

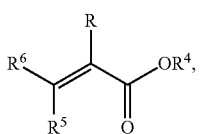

where
R is H or $CH_3$,
$R^4$ represents a linear or branched, saturated or unsaturated alkyl group with 6 to 15 carbon atoms,
$R^5$ and $R^6$ independently represent H or a —COOR" group, where R" is H or a linear or branched, saturated or unsaturated alkyl group with 6 to 15 carbon atoms,
(A3) one or more ethylenically unsaturated ester compounds of formula (III)

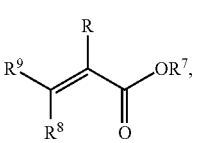

where
R is H or $CH_3$,
$R^7$ represents a linear or branched, saturated or unsaturated alkyl group with 16 to 30 carbon atoms, $R^8$ and $R^9$ independently represent H or a —COOR'" group where R'" is H or a linear or branched, saturated or unsaturated alkyl group with 16 to 30 carbon atoms, and
(A4) at least one N-dispersant monomer selected from the group consisting of vinyl pyridine, N-vinyl imidazole, N-vinyl pyrrolidone (NVP), morpholinoethyl methacrylate, N-vinyl caprolactam, N,N-dimethylaminoethyl methacrylate (DMAEMA), tert-butyl aminoethyl methacrylate, N,N-dimethylaminopropylmethacrylamide (DMAPMAm), dimethylaminopropylacrylamide, and dimethylaminoethylacrylamide;
(c) adding the monomer mixture to the first mineral oil to obtain a mixture;
(d) polymerizing the mixture obtained in (c) to obtain a polymer;
(e) optionally isolating the polymer obtained in (d);
(f) adding at least one N-dispersant monomer unit (A5) selected from the group consisting of vinyl pyridine, N-vinyl imidazole, N-vinyl pyrrolidone (NVP), morpholinoethyl methacrylate, N-vinyl caprolactam, N,N-dimethylaminoethyl methacrylate (DMAEMA), tert-butyl aminoethyl methacrylate, N,N-dimethylaminopropylmethacrylamide (DMAPMAm), dimethylaminopropylacrylamide, and dimethylaminoethylacrylamide;
(g) adding a second reaction initiator to obtain a mixture;
(h) polymerizing the mixture obtained in (g) to obtain the grafted polyalkyl (meth)acrylate copolymer (A);
(i) optionally isolating the grafted polyalkyl (meth)acrylate copolymer (A) to obtain an isolated grafted polyalkyl (meth)acrylate copolymer (A); and/or
(j) diluting the grafted polyalkyl (meth)acrylate copolymer (A), or when the isolating (i) is performed, the isolated grafted polyalkyl (meth)acrylate copolymer (A), with a second mineral oil having a sulfur content of less than 50 ppm,
wherein
the first mineral oil and the second mineral oil are the same or different, and
the grafted polyalkyl (meth)acrylate copolymer (A) comprises
a polymer backbone comprising: 0% to 40% by weight of the monomer unit (A1), 20% to 93.5% by weight of the monomer unit (A2), 5% to 60% by weight of the monomer unit (A3), and 1% to 40% by weight of the monomer unit (A4), where the monomer units (A1) to (A4) add up to 100% by weight based on a total weight of the polymer backbone; and
0.5% to 10% by weight of at least one grafted side chain, which is the monomer unit (A5) grafted onto the polymer backbone, based on a total weight of the grafted polyalkyl(meth)acrylate copolymer (A).
2. The process according to claim 1, wherein the monomer unit (A1) is used in the process and $R^2$ and $R^3$ in the formula (I) are hydrogen.
3. The process according to claim 1, wherein $R^5$ and $R^6$ in the formula (II) are hydrogen.
4. The process according to claim 1, wherein $R^8$ and $R^9$ in the formula (III) are hydrogen.
5. The process according to claim 1, wherein the N-dispersant monomer (A4) is N-vinyl pyrrolidone (NVP).
6. The process according to claim 1, wherein the N-dispersant monomer (A5) is N-vinyl pyrrolidone (NVP).
7. The process according to claim 1, wherein the grafted polyalkyl(meth)acrylate copolymer (A) has a number average molecular weight $M_n$ of from 3000 to 150000 g/mol.

8. The process according to claim 1, wherein the first reaction initiator and the second reaction initiator are the same.

9. The process according to claim 1, wherein the first reaction initiator is added in an amount of from 0.5% to 1.5% by weight, based on a total amount of the monomer units (A1) to (A4).

10. The process according to claim 1, wherein the second reaction initiator is added in an amount of from 5% to 15% by weight, based on a total amount of the monomer unit (A5).

11. The process according to claim 1, wherein the first reaction initiator and the second reaction initiator are different.

12. The process according to claim 1, wherein the first mineral oil has a sulfur content of less than 10 ppm.

13. The process according to claim 1, wherein the adding (c) is done over a course of 1 to 5 hours.

14. The process according to claim 1, wherein the adding (c) is done over a course of 2 to 3 hours.

15. The process according to claim 1, wherein the polymerizing (d) occurs in the absence of a chain transfer agent.

16. The process according to claim 1, wherein the monomer unit (A1) is used in (b).

17. The process according to claim 1, wherein the process comprises (e).

18. The process according to claim 1, wherein the process comprises (i).

19. The process according to claim 1, wherein the polymerizing (d) occurs in the presence of a sulfur free chain transfer agent.

* * * * *